Dec. 19, 1933.　　　　W. P. OSGOOD　　　　1,940,436
SEAM REDUCING MACHINE
Filed July 30, 1931　　　2 Sheets-Sheet 1

Inventor
Walter P. Osgood
by Charles W. McDermott
his Attorney

Dec. 19, 1933.                W. P. OSGOOD                1,940,436
                          SEAM REDUCING MACHINE
                          Filed July 30, 1931          2 Sheets-Sheet 2
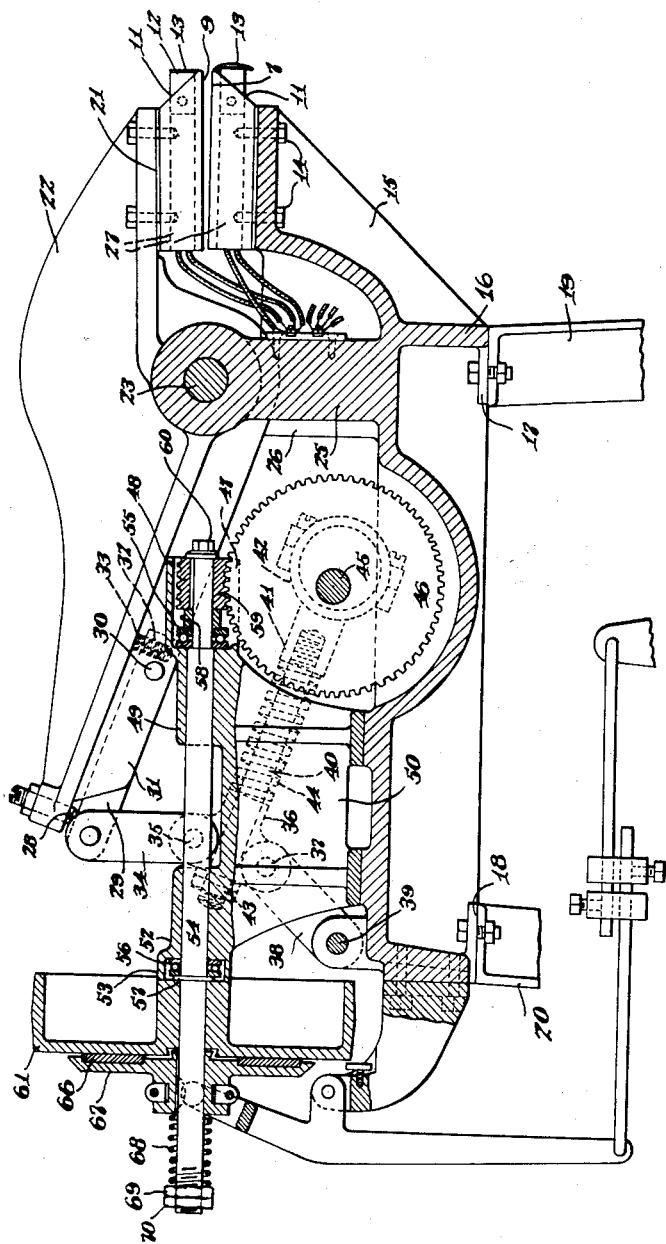
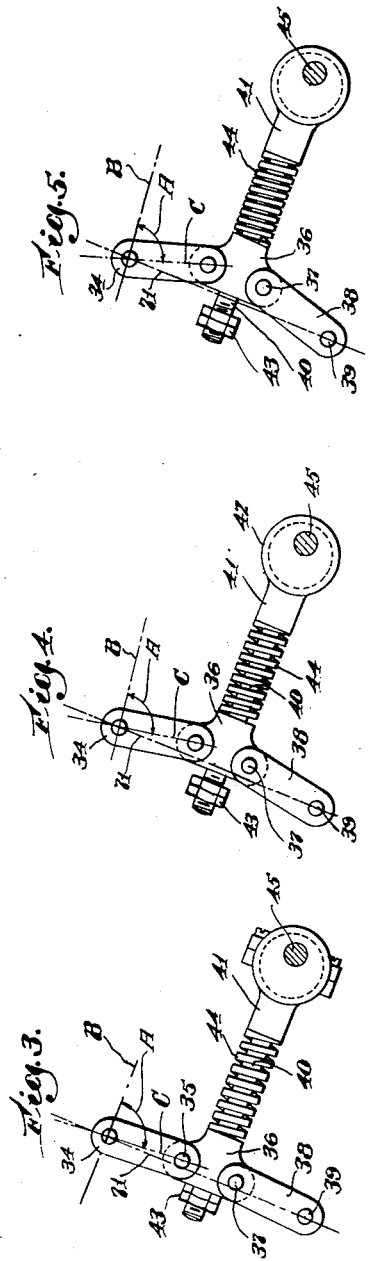
Inventor
Walter P. Osgood
by Charles W. McDermott
his Attorney Patented Dec. 19, 1933

1,940,436

UNITED STATES PATENT OFFICE 1,940,436

SEAM REDUCING MACHINE

Walter P. Osgood, Malden, Mass., assignor to Boston Machine Works Company, Lynn, Mass., a corporation of Massachusetts Application July 30, 1931. Serial No. 553,917

3 Claims. (Cl. 12—51)

The present invention relates to machines for subjecting work to pressure and more particularly, but not exclusively, to machines which are used in the manufacture of boots and shoes to reduce the seams in shoe uppers.

In my application Serial No. 446,502, filed April 23, 1930, I disclose the first commercial machine known to the shoe industry for reducing the longitudinal seam connecting the parts of the lining of a made shoe upper closed at the heel. This machine is provided with an anvil jaw, a pressing jaw and mechanism acting automatically to bring the jaws into a position of direct pressure, to hold them in such position to reduce the seam and thereafter to separate them to afford an opportunity for the operative to insert a new work piece between the jaws. The pressing jaw has a positive stroke which may be varied. This is dangerous theoretically as it is possible by an abnormal variation in the length of the pressure stroke or by the insertion of a block of foreign substance between the jaws to bring the pressing jaw into engagement with the work too early in the cycle of operations and thus strain some part of the operating mechanism perhaps to the point of breaking.

The principal object of the present invention is to produce a machine for subjecting work to pressure which may be operated safely under abnormal conditions.

To the accomplishment of this object, a feature of the present invention contemplates the provision in a machine for subjecting work to pressure having a variable stroke pressure mechanism, of means for varying the amount of pressure exerted by said mechanism directly with the length of the stroke.

With this construction the maximum pressure which the mechanism is capable of exerting during its longest stroke may be one well within the strength of the operating mechanism. Any variation from this longest stroke will result in a reduction from the maximum pressure thus insuring a factor of safety under all conditions.

Broadly considered the machine may be provided with mechanism for controlling the length of the pressure stroke or the pressure stroke may be limited by engagement with the work and thus the length of the stroke may vary in accordance with the thickness of the work, the stroke being longer for a thin piece than for a thicker piece. It is preferred, however, to employ a construction responsive both to a control of the pressure stroke and to the thickness of the work. When the length of the stroke of the pressure mechanism varies on account of the thickness of the work and not because of any adjustment of the machine, pressure exerted by the pressure mechanism varies inversely with the thickness of the work.

Other features of the present invention consist in certain devices, combinations and arrangements of parts hereinafter described, and then pointed out broadly and in detail in the appended claims possessing advantages readily apparent to those skilled in the art.

The various features of the present invention will be readily understood from an inspection of the accompanying drawings illustrating the best form of the invention at present known to the inventor, in which, Figure 1 is a view in left side elevation of a machine for pressing at a single stroke the longitudinal seam of the lining of a made shoe upper closed at the heel exemplifying one type of pressure mechanism embodying the various features of the present invention;

Fig. 2 is a view in longitudinal sectional elevation, and

Figs. 3, 4 and 5 are diagrammatic views illustrating how the pressure exerted by the pressure mechanism varies directly with the length of its stroke and/or inversely with the thickness of the work or the duration of the dwell.

Figure 1:
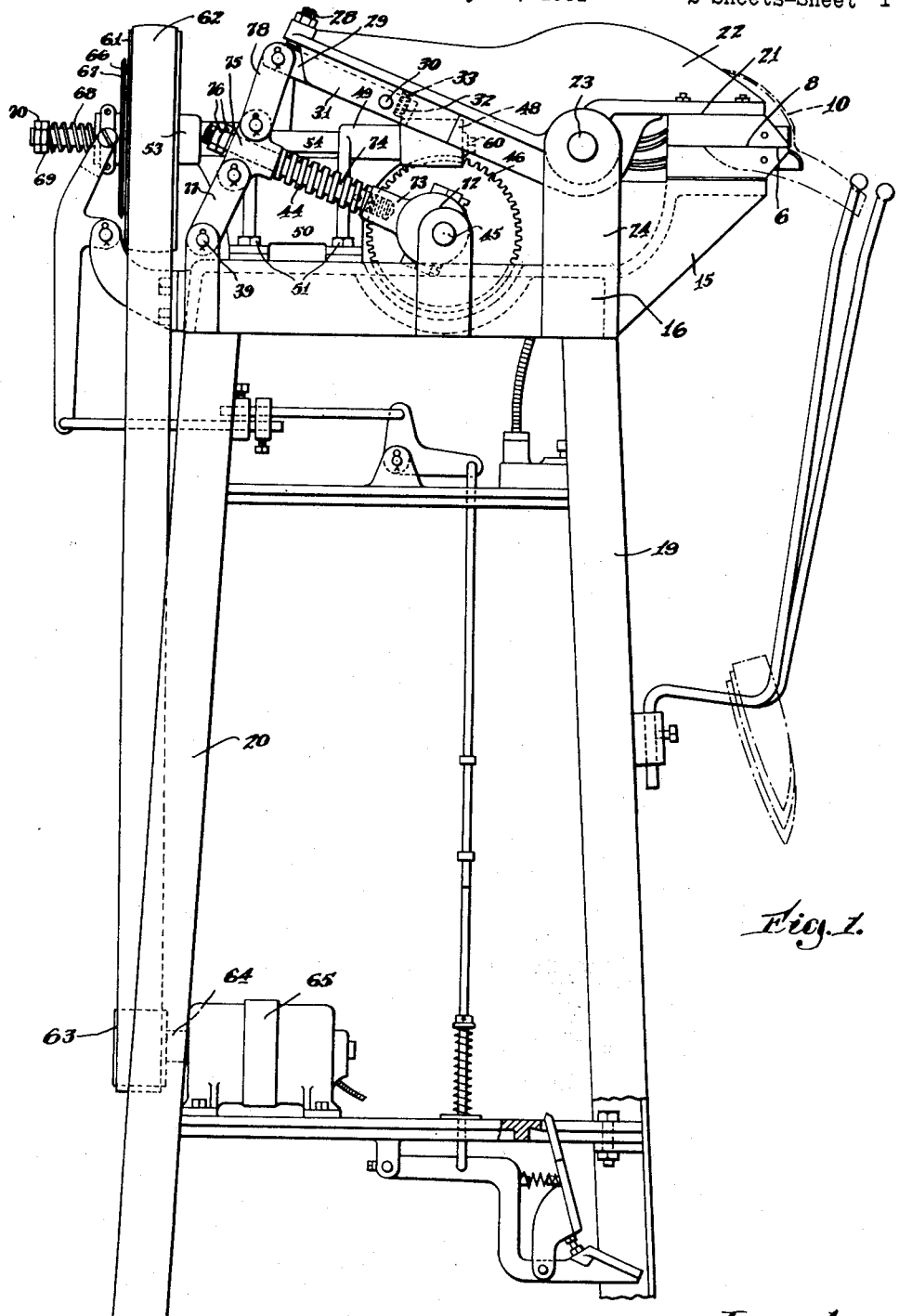

The illustrated embodiment of the present invention reduces the longitudinal seam connecting the parts of a two piece lining while it is secured by the tip seam of a made upper and closed at the heel in the manner disclosed in my application hereinbefore referred to.

The illustrated embodiment of the invention is provided with anvil jaws 6 (Fig. 1) and 7 (Fig. 2) with which cooperate pressing jaws 8 (Fig. 1) and 9 (Fig. 2), respectively. Each of the anvil jaws is provided with a smooth, narrow, flat face which engages the bottom of the longitudinal seam in the lining. Each of the pressing jaws is provided with a smooth, narrow, flat face which engages the top of the seam. The lining is inserted between a cooperating pair of the anvil and pressing jaws so that when they are brought into a position of pressure the longitudinal seam in the lining will be pressed flat. When the lining is inserted between a cooperating pair of anvil and pressing jaws the vamp 10 (Fig. 1) is bent upwardly to permit the pressing jaw to enter between the vamp and the lining and press the seam. To prevent the vamp from being caught in between the jaws, they are provided with longitudinal bores 11, respectively, in the front end of each of which is secured a cylindrical plug 12 bearing upon its front face a guard plate 13. The guard plates 13 assist the operative in the insertion of the lining between the jaws.

The anvil jaws are secured by bolts 14 (Fig. 2) to a flat surface extending across the front end of the machine and formed on a shelf 15 projecting upwardly and forwardly from a bed 16. The bed 16 is provided with front and rear horizontal cross ledges 17 and 18 (Fig. 2) which are bolted, respectively, to a pair of front legs 19 and to a pair of rear legs 20. The legs support the bed 16 in an elevated position from the factory floor at a convenient height therefrom so that the operative may stand at the front of the machine and insert the linings, one at a time, between the jaws.

Each of the pressing jaws is bolted to a flat bottom 21 formed on the front end of a swinging head or beam 22. Each head 22 is pivoted on a stiff horizontal rod 23 supported by three sections 24 (Fig. 1), 25 and 26 (Fig. 2) of a vertical wall on the bed 16. The left hand head, as the operative views the machine, swings on the rod 23 between the wall sections 24 and 25 while the right hand head swings on the rod 23 between the wall sections 25 and 26. The axis of the rod 23 lies in the horizontal plane of the pressing face on the pressing jaw in its position of pressure so that the longitudinal seam of the lining is flattened throughout its extent at a single stroke of the pressing jaw. Thus, the entire length of the seam is pressed coincidentally.

In order to heat the jaws the bores 11 therein receive, respectively, heating cartridge coils 27 connected to some suitable source of electricity. By heating the anvil and pressing jaws and by swinging the heads 22 to bring a pair of cooperating jaws into engagement with the longitudinal seam of the lining supported between them the longitudinal seam is subjected to heat and a heavy pressure.

In order to swing the heads 22, each of them is provided with an adjusting screw 28 the bottom of which engages an end face on a lever 29 near the rear end thereof. Near its front end the lever 29 is pivoted on a horizontal pin 30 carried by the yoked side walls 31 of the rear end of the head 22 which house the lever 29. Between its front end and the pin 30 the lever 29 is provided with a chamber 32. A coiled spring 33 is interposed between the bottom of the chamber 32 and the bottom of the rear end of the head 22.

In the illustrated embodiment of the invention the heads 22 are swung forwardly and backwardly by mechanism operating automatically and continuously to bring one pair of anvil and pressing jaws into a position of clearance and to bring the other pair of anvils and pressing jaws into a position of pressure. The heads 22 are held stationary when the jaws are brought into their positions of pressure and clearance. During the position of clearance the operative inserts the lining of the made shoe upper between the supported jaws. During the position of pressure the longitudinal seam in the toe lining is flattened and the overlapped parts in the seam are consolidated into an integer substantially uniform in thickness throughout its extent by the combined action of heat and heavy pressure. Tests demonstrate that the illustrated embodiment of the present invention increases the tensile strength of the seam articulating the toe lining parts.

In order to swing that head 22, which is shown in its position of clearance (Fig. 2), the lever 29 is pivoted to one end of a link 34. The other end of the link is pivoted at 35 to a floating link 36 at one side of its center line. On the other side of its center line the floating link 36 is pivoted at 37 to one end of a link 38. The other end of the link 38 is pivoted on a horizontal rod 39, supported by a plurality of bosses on the bed 16. The floating link 36 loosely receives a rod 40 having one end threaded into a strap 41 which embraces the periphery of an eccentric 42. The other end of the rod 40 is provided with a pair of adjusting and locking nuts 43. Coiled about the rod 40 and interposed between the floating link 36 and the strap 41 is a spring 44. The eccentric 42 is keyed to a horizontal cross shaft 45, journaled in bearings formed in the bed 16. Secured centrally on the shaft 45 is a worm wheel 46, which works in a slot 47 formed in a housing 48 integral with a bearing 49. The bearing 49 is formed in a bracket 50 secured by four bolts 51 (Fig. 1) to the bed 16. The bracket 50 carries a second bearing 52 having an integral housing 53 (Fig. 2). Journaled in the bearings 49 and 52 is a horizontal shaft 54.

The shaft 54 is held from movement longitudinally in the bearings 49 and 52 by a thrust bearing 55 mounted on a reduced diameter portion of the shaft 54 at the front end thereof and by a thrust bearing 56 mounted on the shaft 54 within the housing 53. The thrust bearing 56 is held in engagement with the bearing 52 by a shoulder 57 formed on the shaft 54. The thrust bearing 55 is held in engagement with the bearing 49 by a spacing collar 58 which is engaged in turn by a worm 59 backed by a bolt 60 threaded into the front end of the shaft 54. The worm 59 meshes with and drives the worm wheel 46.

In order to rotate the shaft 54 it carries adjacent the shoulder 57 a loose pulley 61 which is rotated by a belt 62 which passes around the pulley 61 and a smaller pulley 63 secured to the armature shaft 64 of an electric motor 65. In order to clutch the pulley 61 to the shaft 54, the rear face of the pulley is engaged by a friction ring 66 secured to one face of a disk 67, the hub of which is splined to the rear end of the shaft 54. The disk 67 is pressed normally in a direction to engage the ring 66 with the rear face of the pulley 61 by a spring 68 coiled about the rear end of the shaft 54 and interposed between the hub of the disk 67 and suitable spring tension adjusting and locking nuts 69 and 70 threaded on the rear end of the shaft 54.

With this construction starting the electric motor 65 drives the belt 62 and rotates the pulley 61 which is clutched to the shaft 54 by means of the friction disk 67. Rotation of the shaft 54 drives the worm-wheel 46 through the worm 59 meshed therewith. The worm-wheel 46 rotates the shaft 45 which in turn rotates the eccentric 42.

The links 34, 36 and 38 constitute a toggle. When the eccentric 42 is rotated the links of the toggle are partially made, in a manner presently to be described, to swing the head 22 downwardly and thus bring the pressing jaw into a position of pressure.

In explaining the construction and mode of operation of the toggle, I will describe first the result obtained by inserting different thicknesses of work between the jaws and second the result produced by varying the pressure stroke of the pressing jaw through manipulation of the screw 28.

From an inspection of Fig. 2 it is apparent that the position of the nuts 43 on the end of the rod 40 determines the initial amount of compression under which the spring 44 is held between the link 36 and the strap 41. The initial amount of pressure exerted by the compressed spring 44 is commensurate with the maximum amount of pressure developed when the pressing jaw engages the anvil jaw with no work between them. The maximum amount of pressure thus developed is well within the strength of the head 22 but is more than is ever exerted upon the work inserted between the jaws. That is, the pressure on the work varies inversely with the distance separating the jaws in their position of pressure. Stated in another way, the pressure on the work varies inversely with its thickness.

Fig. 3 shows the position of the toggle when the pressing jaw engages the anvil jaw with no work between them. The adjusting nut 43 engages the link 36 thus showing that the pressure developed by the engagement of the pressing jaw with the anvil jaw does not exceed the initial pressure of the compressed spring 44. As shown also the pivot points 35 and 37 have come to rest in positions spaced from the plane 71 bisecting the upper and lower pivot points of the links 34 and 38, respectively. It is thus apparent that the toggle falls short of reaching its made position by substantially $\frac{3}{32}$ of an inch when the machine is running idle with no work positioned between the jaws. Referring again to Fig. 3, A represents the angle formed between the median axial lines B and C of the lever 29 and the link 34, respectively, when the toggle has reached its limit of movement towards made position. Because the toggle is not made, angle A is less than a right angle. The practical result of this is that the pressure exerted through the link 34 on the lever 29 is less than it would be if the link 34 constituted a part of a made toggle.

When the work is positioned between the jaws the stroke of the pressing jaws is shortened by the thickness of the work thus causing the toggle to stop moving towards its made position earlier in the cycle than it would stop if no work was between the jaws. (Fig. 3.) This stopping of the movement of the toggle towards its made position earlier in the cycle of operations is permitted by the sliding connection between the link 36 and the rod 40. As shown in Fig. 4 the rod 40 has slid through the link 36 and the adjusting nut 43 has been removed from engagement with the link 36. It is thus apparent that the initial pressure of the compressed spring 44 has been increased but because of the reduction in the angle A (Fig. 4) the pressure actually exerted by the spring 44 through the link 34 on the lever 29 is reduced.

The closer the line C approaches the line B (Figs. 3, 4 and 5) the smaller is the pressure transmitted from the spring 44 to the work. Fig. 5 illustrates the position of the toggle when a thicker work piece is inserted between the jaws. From a comparison of Figs. 3, 4 and 5, it is seen that the angles A in Figs. 4 and 5 are smaller than the angles A in Figs. 3 and 4, respectively. Stated in another way, the pressures exerted through the link 34 on the lever 29 are less in the positions of Figs. 4 and 5 than in the positions of Figs. 3 and 4, respectively. This variation in the angularity with which the pressure is exerted through the link 34 on the lever 29 more than compensates for the increased compressions of the spring 44 owing to the insertion of work pieces of varying thicknesses between the anvil and pressing jaws.

The same beneficial result is obtained by adjusting the screw 28 to shorten the stroke of the pressing jaw. Fig. 3 may be considered as showing the position of the toggle when the screw 28 is adjusted to impart the longest stroke of which the pressing jaw is capable. Fig. 4 shows the position of the toggle when the screw 28 is adjusted to impart a shorter stroke to the pressing jaw. Fig. 5 shows the position of the toggle when the screw 28 is adjusted to impart a still shorter stroke to the pressing jaw. Thus the pressure exerted by the pressing jaw varies directly with the length of its stroke. That is, the greatest pressure is exerted by the pressing jaw on the longest stroke of which it is capable.

It will be apparent from an inspection of Figs. 3, 4 and 5 that adjustment of the screw 28 to vary the length of the stroke of the pressing jaw varies the time during which the pressing jaw dwells in engagement with the work. That is, when the toggle is in the position of Fig. 3 there is a minimum dwell of the pressing jaw on the work. In the position of Fig. 4 there is a dwell. In the position of Fig. 5 there is a longer dwell.

The floating link 36 is an important factor in the construction providing for the dwell of the pressing jaw for a protracted period in engagement with the work. When the pressing jaw engages the work the pivot 35 stops moving towards the plane 71 early or late in the cycle of operations depending upon the length of the stroke determined through the adjustment of the screw 28 and/or by the thickness of the work. When the pivot 35 comes to rest the floating link 36 is oscillated by the eccentric 42 about the stationary pivot 35. Oscillation of the floating link 36 oscillates the link 38 on the rod 39. Some of the pressure exerted by the compressed spring 44 is utilized during this oscillation of the links 36 and 38 thus further reducing the amount of pressure exerted by the pressing jaw upon the work. With a toggle provided with the links 34 and 38 having the independent pivots 35 and 37, the pressure of the pressing jaw on the work is developed early in the cycle of operations. Of course, the earlier the pressing jaw engages the work in the cycle of operations the longer is the dwell in that cycle.

In order that the heads 22 may be swung in opposite directions to bring the two sets of jaws into positions of pressure and clearance alternately, the shaft 45 carries a second eccentric 72 (Fig. 1) keyed thereto. This eccentric is arranged on the shaft 45 with its low side directed in the same direction as the high side on the eccentric 42. The eccentric 72 is embraced by a strap 73 connected to a rod 74 which is a duplicate of the rod 40. The rod 74 slides loosely through a floating link 75. The free end of the rod is provided with adjusting and locking nuts 76, the adjusting nut engaging the floating link 75 when the machine is running idle with no work between the pressing jaws. The link 75 at one side of its center line is pivoted to the upper end of a link 77, the lower end of which is pivoted on the rod 39. On the other side of its center line, the link 75 is pivoted to one end of a link 78, the other end of which is pivoted to the lever 29 of the left hand head or beam 22, as the operative views the machine. This left hand head is swung downwardly and upwardly to bring the pressing jaw into its position of pressure and clearance, respectively, and is held stationary to maintain the pressing jaw in its position of pressure and clearance for protracted periods in accordance with the adjustment of the screw 28.

Nothing herein explained is to be interpreted as limiting the various features of the present invention in the scope of its application to use in connection with the particular machine or the particular mode of operation or both selected for purposes of illustration and explanation. While the particulars of construction herein set forth are well suited to one mechanical form of the invention and to the use to which it is put, it is not limited to this use, nor to these details of construction, nor to the conjoint use of all its features, nor is to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new, is:

1. A seam reducing machine having, in combination, an anvil jaw, a pressing jaw, mechanism acting automatically to bring the jaws into a position of direct pressure, to hold them in such position and thereafter to separate them, means for varying the time during which the jaws are held in the position of pressure, and means for varying the amount of pressure developed by the jaws inversely with the time during which the jaws are held in pressure position.

2. A shoe machine having, in combination, a work support, a pressing form, mechanism operating automatically to impart a relative movement to the support and form to bring them alternately into a position of pressure and a position of clearance including a toggle having two links connected by a third link, a rod slidably connected to the third link, mechanism for operating the rod, and a spring coiled about the rod and interposed between said mechanism and the third link.

3. A shoe machine having, in combination, a work support, a pressing form, mechanism operating automatically to impart a relative movement to the support and form to bring them alternately into a position of clearance including a toggle having two links connected by a third link, an eccentric, a rod having one end operatively connected to the eccentric and its other end slidably connected to the third link, and a spring coiled about the rod and interposed between the eccentric and the third link.

WALTER P. OSGOOD.